(12) United States Patent
Potts et al.

(10) Patent No.: US 7,193,176 B2
(45) Date of Patent: Mar. 20, 2007

(54) SAFETY ISOLATION OF ARC WELDING EQUIPMENT

(75) Inventors: Brian Potts, Darlington (AU);
Zdzislaw Bruszewski, 95 Gradient Way, Beldon 6027 (AU)

(73) Assignee: Zdzislaw Bruszewski, Beldon (AU)

( * ) Notice: Subject to any disclaimer, the term of this patent is extended or adjusted under 35 U.S.C. 154(b) by 236 days.

(21) Appl. No.: 10/881,505

(22) Filed: Jun. 29, 2004

(65) Prior Publication Data

US 2005/0051526 A1 Mar. 10, 2005

Related U.S. Application Data

(63) Continuation-in-part of application No. PCT/AU03/00059, filed on Jan. 21, 2003.

(30) Foreign Application Priority Data

Jan. 29, 2002 (AU) .................................. PS0180
Feb. 10, 2004 (AU) ............................ 2004900617

(51) Int. Cl.
*B23K 9/10* (2006.01)
(52) U.S. Cl. .................................................... 219/132
(58) Field of Classification Search ................ 219/132, 219/130.1, 130.21, 130.31, 130.32, 130.33, 219/130.4
See application file for complete search history.

(56) References Cited

U.S. PATENT DOCUMENTS 2,964,681 A * 12/1960 Anderson .................... 219/132
3,445,622 A * 5/1969 Hubbard ................. 219/124.02
4,151,396 A * 4/1979 Veal ............................ 219/132
4,410,789 A * 10/1983 Story ........................... 219/132

FOREIGN PATENT DOCUMENTS

| JP | 11-254135 A | 9/1999 |
|---|---|---|
| JP | 2000-061641 A | 2/2000 |
| JP | 2000-326070 A | 11/2000 |

OTHER PUBLICATIONS

Derwent Abstract Accession No. 83246X/45, Class M23 P55 DE 122208 A, Sep. 20, 1976, Peters, figures.
Derwent Abstract Accession No. 93-257191/32 Class P55 SU 1758057 A1, Aug. 23, 1992, Cherpovets Stalkonstruktsiya Trust, abstract.

* cited by examiner

*Primary Examiner*—Clifford C. Shaw
(74) *Attorney, Agent, or Firm*—Hogan & Hartson LLP

(57) ABSTRACT

A safety interlock system for an arc welder is described. The safety interlock system is interfaced with and turns on the arc welder in response to a user pressing a button 15. There may be an optional delay from when the user presses the button until when the arc welder is turned on. The safety interlock system maintains the arc welder operative for a predetermined period of time within which time an arc must be struck. The safety interlock system has a latching circuit 29 responsive to a parameter indicative of a welding operation underway, and will maintain the arc welder operative until the parameter ceases. Once the parameter ceases or if an arc is not struck within the predetermined period of time, the safety interlock system turns off the arc welder.

29 Claims, 4 Drawing Sheets

SAFETY ISOLATION OF ARC WELDING EQUIPMENT

RELATED APPLICATIONS

Pursuant to 35 U.S.C. § 111 (a) and 37 C.F.R. § 1.53(b), the present application is a continuation-in-part application of International Patent Application No. PCT/AU03/00059 entitled SAFETY ISOLATION OF ARC WELDING EQUIPMENT, which was filed Jan. 21, 2003, and claims priority of Australia Provisional Patent Application No. PS 0180, which was filed Jan. 29, 2002, and is related to Australia Provisional Patent Application No. 2004900617 filed Feb. 10, 2004, all of which applications are incorporated herein by this reference in their entireties.

FIELD OF THE INVENTION

This invention relates to arc welders, and in particular safety isolation of the same, to minimize the chance of electric shock or death.

BACKGROUND ART

Arc welders of the type that utilise a stick, often referred to as slick welders, have a lethal voltage present at the welding stick, when activated. While this voltage may fall to about 12V to 20V when welding operations are under way, the voltage can rise to up to 100V under open-circuit conditions. While 12 to 20V is not likely to be fatal, in the unlikely chance of a person coming into contact with the stick during welding, 100V can be fatal if a person comes into contact with it. In any event, the chance of a person coming into contact with the open circuit stick carrying up to 100V is greater than the chance of coming into contact with the stick during a welding operation.

Arc welders of the type described above are controlled by a switch (sometimes contained in the handset), which causes a control circuit to operate. In a DC arc welder, the control circuit controls generation of the DC current which is delivered to the welding rod or welding stick, which is held in the handset, the handset being moveable to allow the person welding to manipulate the welding stick over the work as the welding operation progresses. When the switch is operated, the control circuit causes a direct current (DC) voltage to be switched to the stick. Under open circuit conditions which are present before welding commences the voltage rises to up to 100 VDC. It is at this time that a person coming into contact with the stick is at risk of electric shock or electrocution.

It is an object of the present invention to provide a safety interlock in an arc welder to minimise the risk of electric shock or electrocution.

Some types of arc welder utilise AC power to preform welding operations. While part of the aforementioned discussion is made with reference to DC arc welders, it should be understood that the invention to be described has equal application in AC arc welders.

Throughout the specification, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

In accordance with the invention there is provided a safety interlock system for an arc welder comprising an actuating circuit responsive to a command signal for turning on said arc welder, said command signal being produced by a user pressing a push switch, said actuating circuit having an output normally in an off condition and arranged to go to an on condition in response to said command signal, said output being interfaced with said arc welder to turn on said arc welder in said on condition, said safety interlock system including a timer to place said output in said on condition for a predetermined period of time whereafter said off condition is resumed, said safety interlock system having a latching circuit responsive to a parameter indicative of a welding operation underway, and adapted to maintain said arc welder operative until said parameter ceases, characterised in that on resumption of said off condition, said push switch must first be released before said output can again go to said condition.

Preferably said timer is associated with said actuating circuit.

Preferably said output comprises a switch controlled by said timer. Operation is such that when the command signal first appears, the timer places said switch in said on condition for said predetermined period of time, after which said switch reverts to said off condition.

Preferably said predetermined period of time is up to twenty seconds.

Preferably said predetermined period of time is up to ten seconds.

Preferably said predetermined period of time is from 0.1 seconds, although in plasma arc welding the time could be less than this.

Preferably said predetermined period of time is from half a second to four seconds.

Preferably said predetermined period of time is from about one to about three seconds.

Preferably said predetermined period of time is about two seconds.

Preferably the latching circuit comprises a magnetic field sensor, and has switching means wired in parallel with said switch, said magnetic field sensor being located in close proximity to the main cable supplying current for the arc welding operation, so that the switching means is actuated when the magnetic field sensor detects current in the main cable. Thus the parameter with such an arrangement is a magnetic field associated with heavy current flowing in the main cable to the welding electrode.

Preferably said magnetic field sensor and said switching means are provided by a reed switch. The switching means comprises the switch contacts of the reed switch.

Operation of the safety interlock system is as follows. When the arc welder including the safety interlock system is in standby, the output of the actuating circuit is in the off condition, and there is no voltage present at the welding rod. When the operation desires to weld, a push button switch is pressed, generating said command signal. Said command signal causes said timer in said actuating circuit to close said switch to place the output of the actuating circuit in said on condition for said predetermined period. The actuating circuit is said on condition causes the arc welder to go on, causing the voltage at the welding rod to rise to around 100VDC. If welding does not commence within the predetermined period of time, the actuating circuit goes back to said off condition at the end of the predetermined period, and the voltage falls at the welding rod, so that if a person is receiving an electric shock, that shock will cease. If the welding commences, a large current flows in the main cable to the electrode. This large current generates a magnetic field sufficient to switch the reed switch which is wired in parallel with said switch. The reed switch maintains the welder operational until such time as the welding operation is interrupted or stops. To restart the welding operation again, the user merely presses the push button switch again.

It is not necessary for the user to maintain the push button switch pressed, to continue welding, as operation of the welder is reliant on the latching circuit. Thus, the system provides an arrangement whereby a user cannot override the safety interlock system by taping the push button switch in a pressed condition.

Preferably said safety interlock system includes a first timer timing out a first predetermined period said push switch must be pressed before said output goes to said on condition. The push switch may be pressed and hold for this first predetermined period in one embodiment, or in a alternative embodiment may be double pressed within this first predetermined period before said output goes to said on condition.

Preferably said first predetermined period is at least 0.1 seconds.

Preferably said first predetermined period is at least 0.25 seconds. The first predetermined period may be advantageously between 0.5 seconds and two seconds, and is designed to ensure the arc welder will not start due to inadvertent pressing of the push button.

Preferably the first predetermined period is about 0.5 seconds.

Preferably said first timer times out said first predetermined period said push switch must be held pressed by the user before said output goes to said on condition.

Preferably said first timer times out said first predetermined period within which said push switch must be pressed at least twice (at least double clicked) by the user before said output goes to said on condition.

Preferably said first timer times out said first predetermined period within which said push switch must be pressed twice (double clicked) by the user before said output goes to said on condition.

Preferably said first timer times out said first predetermined period within which said push switch must be pressed twice and held pressed on the second pressing by the user before said output goes to said on condition.

Preferably said safety interlock system includes a transmitter and receiver pair, said transmitter being responsive to said push button switch being pressed, and said receiver providing said command signal in response to a valid signal received from said transmitter.

Preferably or alternatively said timer is associated with said transmitter.

Preferably said transmitter incorporates said first timer, timing out said first period before said transmitter will transmit a signal.

Preferably said transmitter includes a second timer timing out a second predetermined period that said transmitter transmits said signal. The second timer equates to said timer as hereinbefore defined.

Preferably said second predetermined period is up to twenty seconds.

Preferably said second predetermined period is up to ten seconds.

Preferably said second predetermined period is from 0.1 seconds, although this time could be less for plasma arc welders as discussed above.

Preferably said second predetermined period is from half a second to four seconds.

Preferably said second predetermined period is from about one to about three seconds.

Preferably said second predetermined period is about two seconds.

Three embodiments could be made incorporating the timer in the transmitter. These are two embodiments with, and one embodiment without the timer incorporated in the actuation circuit. Two of the embodiments would operate in the following manner. When a push button switch on the transmitter is pressed and held down, closing its contacts for the first predetermined period, at the end of the first predetermined period the transmitter transmits a coded binary signal for the second predetermined period. In these two embodiments, once the first predetermined period has ended the transmission will continue for the second predetermined period regardless as to whether the push button switch on the transmitter is released or continues to be pressed. When the transmission is received, if valid, a command signal is produced by the receiver causing the actuating circuit to be placed in the on condition. In one of these two embodiments the on condition runs for said predetermined period, determined by the timer incorporated in the actuation circuit.

In the second of these two embodiments there is no timer associated with the actuation circuit and the on condition runs for said second predetermined period, only as long as the transmission continues.

In the third embodiment there is the first timer associated with the transmitter, timing out the first predetermined period only, and a timer associated with the actuation circuit timing out said predetermined period. In this third embodiment when the push button is pressed and held down on the transmitter, the first predetermined period is timed out and at the end of this the transmission begins. On receipt of the transmission, if valid, a command signal is produced by the receiver causing the actuating circuit to be placed in the on condition for said predetermined period after which the actuating circuit returns to the off condition regardless as to whether the transmission continues.

In all three embodiments, an arc must be struck within the predetermined period or the second predetermined period (if and as applicable) for latching by the reed switch to take place.

In three further embodiments, as alternative embodiments to the three described above, instead of holding the push button down for the duration of the first predetermined period, the push button is double pressed within the first predetermined period to cause the transmitter to transmit, as described above.

Preferably said transmitter and receiver pair incorporate coded encryption. In this manner different pairs can have different code, so that only the correct arc welder is operated when the push button switch is pressed.

BRIEF DESCRIPTION OF THE DRAWINGS

Five preferred embodiments of the invention will now be described in the following description made with reference to the drawings, in which.

BEST MODE(S) FOR CARRYING OUT THE INVENTION

All five embodiments are safety interlock systems for an arc-welding unit, which prevents high voltage from being present at the welding stick until desired by the operator, and also prevents the operator from overcoming the safety interlock, as will be understood from the following description.

The first embodiment will now be described. The safety interlock system is provided in two parts, the first being a transmitter unit which is shown in FIG. 1, and the second being a receiver unit and associated parts which are wired into the control unit for the arc welder, and are shown generally in FIGS. 2 and 3.

Figure 1:
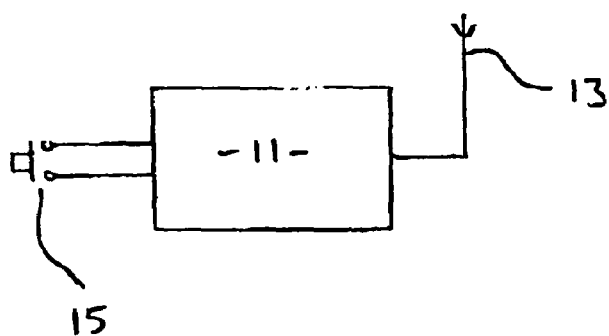
FIG. 1 is a block diagram of a transmitter unit for a safety interlock system according to the first embodiment, for an arc welder.

Referring to FIG. 1, the transmitter unit has a code encrypted transmitter circuit 11 which transmits a coded through its antenna 13 when a user presses the push-to-make switch 15. The circuit 11, antenna 13, and switch 15 are contained in a small enclosure, which may be hand-held, or clipped to the hand-piece of the arc welder. The transmitter circuit transmits a coded signal on a frequency of 303.875 MHz. The signal is coded in that a serial binary code specific to the encryption in a receiver unit is transmitted, and the receiver unit is responsive only to the transmitter circuit having the same coded encryption. In this manner, other receiver units connected to other arc welders will not be activated. This arrangement is the same as that used in remote operated car immobilisers and alarms, so that when a user presses the button on their key-fob transmitter, the control unit in the users vehicle responds, while control units in other vehicles being responsive to different coded signals, do not respond. A suitable transmitter unit is a NESS Security Products, part no. 100-655.

Figure 2:
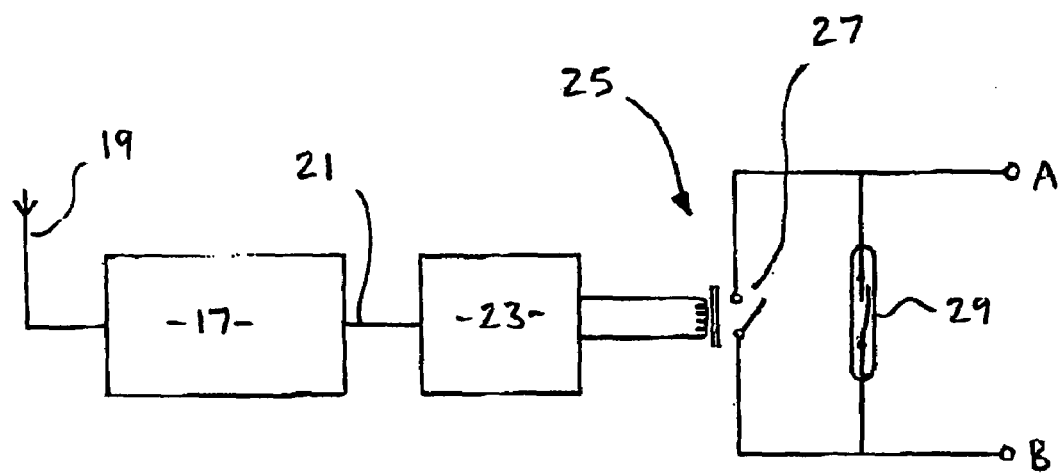
FIG. 2 is a block diagram of a receiver unit and safety interlock system according to the first embodiment, for an arc welder.

Referring to FIG. 2, the receiver unit has a code encrypted receiver circuit 17 which is connected to an antenna 19 and is responsive to RF signals at 303.875 MHZ. The receiver unit 17 has code encryption so that it issues a command signal at the receiver circuit output 21 only when a valid code encrypted signal is received at the antenna. The antenna 19 should be sufficiently large so that if the receiver is located remotely from where welding operations take place, it will receive signals from the transmitter unit. This can be required in multilevel building sites.

The receiver unit has an actuating circuit which includes a timer circuit 23 and a relay 25. The contacts 27 of the relay 25 are interfaced to the control circuit in the arc welder (via terminals A and B), to energise the electrode of the arc welder when the relay is energised and its contacts 27 close.

When a command signal appears at the receiver circuit output 21, the timer circuit 23 energises the relay 25 for a period of 2 seconds, the timer circuit ceases to energise the relay 25, whether the command signal is present (indicative of the switch 15 being held closed by the user) or not present, causing the contacts to open. This feature is quite useful, since it prevents a user from taping the switch 15 closed. In attempting to over-ride the safety interlock system.

The receiver unit includes a latching circuit provided by a magnetic field sensor in the form of a reed switch 29, which is wired in parallel with the contacts 27 of the relay 25. The reed switch is located along the main cable loading to the arc welding gun, and physically aligned so that if an arc is struck (ie welding commences) the current in the main cable causes a magnetic field which closes the reed switch 29. With the reed switch 29 closed, the control circuit in the arc welder will continue to energise the arc welder, allowing a welding operation to continue, regardless of the state of the contacts 27 of the relay 25. When welding is interrupted or ceases, the reed switch 29 will open immediately, causing the control circuit in the arc welder, to de-energise the electrode of the arc welder (assuming the contacts 27 of the relay 25 haven't closed again because the switch 15 in the transmitter unit had been pressed in the preceding 2 second period).

If welding does not commence within the 2 second period, the contacts 27 of the relay 25 will open causing the control circuit in the arc welder, to de-energise the electrode of the arc welder. In this condition there is no risk of electric shock or electrocution.

To start welding again, the user presses the switch 15 and commences welding within 2 seconds.

It must be understood that the control circuit in the arc welder may need to include some buffering, so that any cycling in the reed switch due to the intermittent nature of current flow to the welding electrode will not interrupt operation. If such buffering is not present, it can readily be provided, as a person skilled in the art will appreciate.

Figure 3:
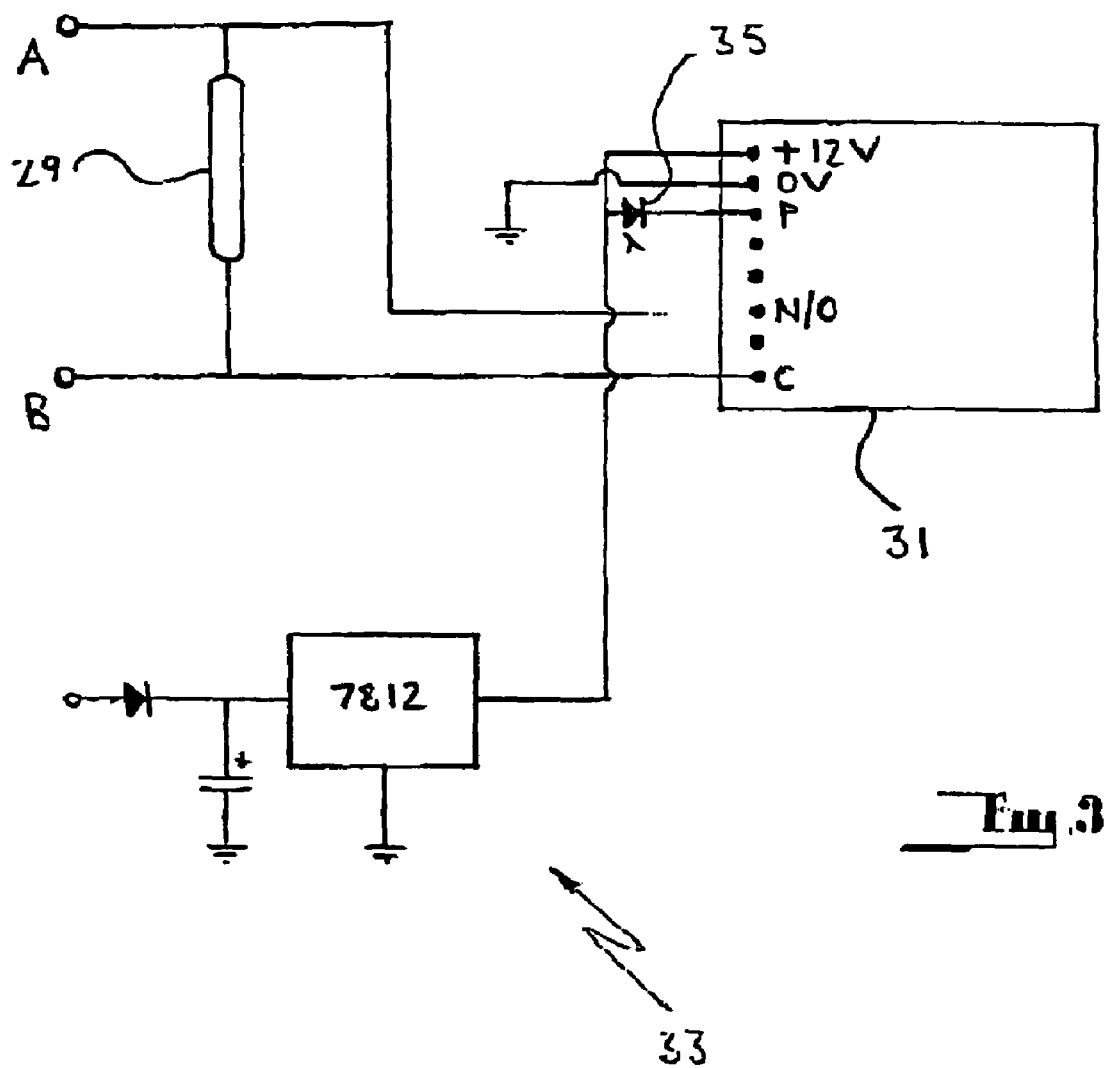
FIG. 3 is a wiring diagram showing implementation of the receiver unit of FIG. 2.
Figure 4:
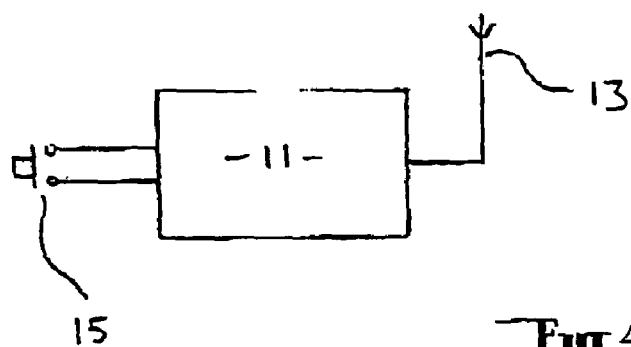
FIG. 4 is a block diagram of a transmitter unit for a safety interlock according to the second embodiment.

Referring to FIG. 3, the receiver circuit 17, timer circuit 23, and relay 25 are contained on a circuit board 31, being a stand-alone receiver from Ness Security Products, catalog no. 105-216 580-167-2. The wiring to the contacts 27 of the relay is indicated as C and N/O. The terminals A and B are connected to the control circuit in the arc welder, A light emitting diode (LED) 35 illuminates when the contacts 27 of the relay 25 have closed, causing the control circuit in the arc welder to energise the electrode of the arc welder. This indicates to the user that the electrode is live and unsafe. The LED does not illuminate if the reed switch 29 is closed, but this is of no consequence, since the user will be welding, and aware that the electrode is live.

A regulated power supply 33 provides 12VDC to power the circuit board 31. The regulated power supply 33 is in turn powered by a 10V–28V DC or AC source delivered from the welder. In an alternative arrangement where such a power supply is not available, the power can be supplied by a plug-back power supply.

Figure 5:
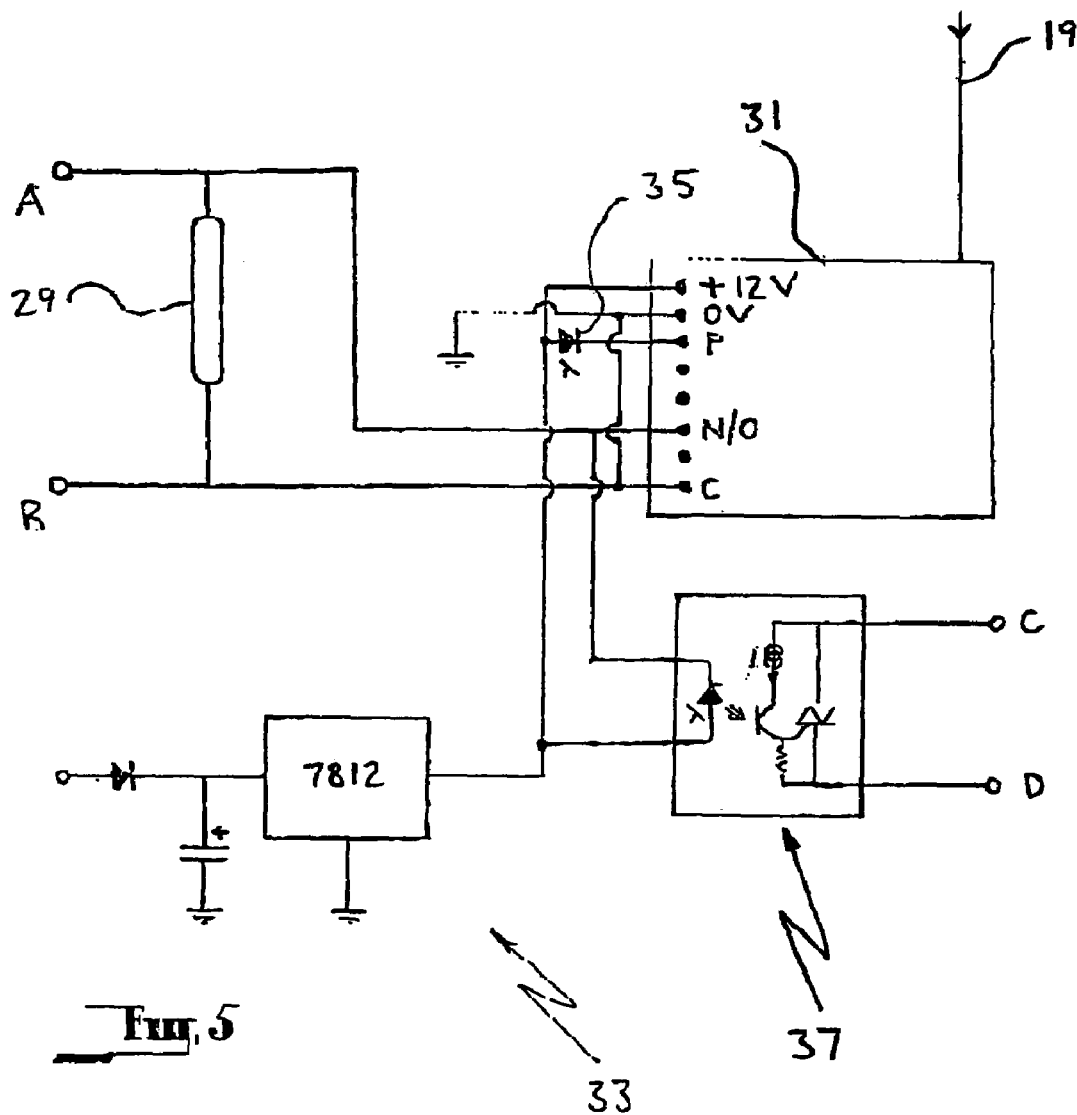
FIG. 5 is a wiring diagram showing implementation of the receiver unit according to the second embodiment.

The second embodiment is similar to the first, except in two respects. In the second embodiment, referring to FIG. 5, the receiver circuit 17, timer circuit 23 and relay 25 are contained or a circuit board 31 being a standalone receiver from Ness Security Products, catalog no 105-216 580-167-2. The second embodiment includes a solid state relay 37, the "contacts" of which, connected to terminals C and D are connected to the control circuit in the arc welder. The relay 25 on the circuit board is used merely to actuate the solid state relay 37. The reed switch 20 maintains the solid state relay 37 in an actuated condition once welding commences. This embodiment is intended to be used where the on-board relay 25 of the circuit board or the reed switch do not have the current carrying capacity to actuate the control circuit in the arc welder. A solid state relay is more desirable than a heavy duty relay or contactor in high current applications as the contacts can fuse together in high current applications, leaving the electrode of the arc welder "live". In this embodiment, terminals A and B are not connected to the arc welder.

Solid state relays are well known in the art as replacements for mechanical relays. A suitable solid state relay capable of switching three phases is the RS Components (RadioSpares) RS stock no. 181-5999.

The second variation in the second embodiment is the incorporation of timing into the code encrypted transmitter circuit 11, shown in FIG. 1, the code encrypted transmitter circuit 11 of the second embodiment incorporates a Ness Security Products part no. 100-678. A first timer is provided in the transmitter circuit 11 where the push-to-make switch must be held closed for a first predetermined period of half a second before the transmitter circuit 11 will begin transmitting. This ensures that welding cannot begin when the switch 15 is accidentally or inadvertently pressed, as might happen if there has been a fall or some other accident. Once the transmitter circuit 11 begins transmitting a second timer times out a second predetermined period of two seconds for which the transmission continues regardless as to whether the switch 15 is released or not. Operation of the second embodiment, other than in respect of the matters discussed above, is the same as the first embodiment.

The arc must be struck within the predetermined period of two seconds controlled by the timer circuit 23 in the receiver unit.

The second embodiment incorporates useful safety features. For example if the switch 15 is inadvertently pressed, the welding electrode will not go live. In the event that the operator falls and jams the switch 15 on, the welding electrode will go live, but only for two seconds. Research has suggested that this two second period is not long enough to cause death or injury in the event that the operator is in contact with the electrode.

Figure 6:
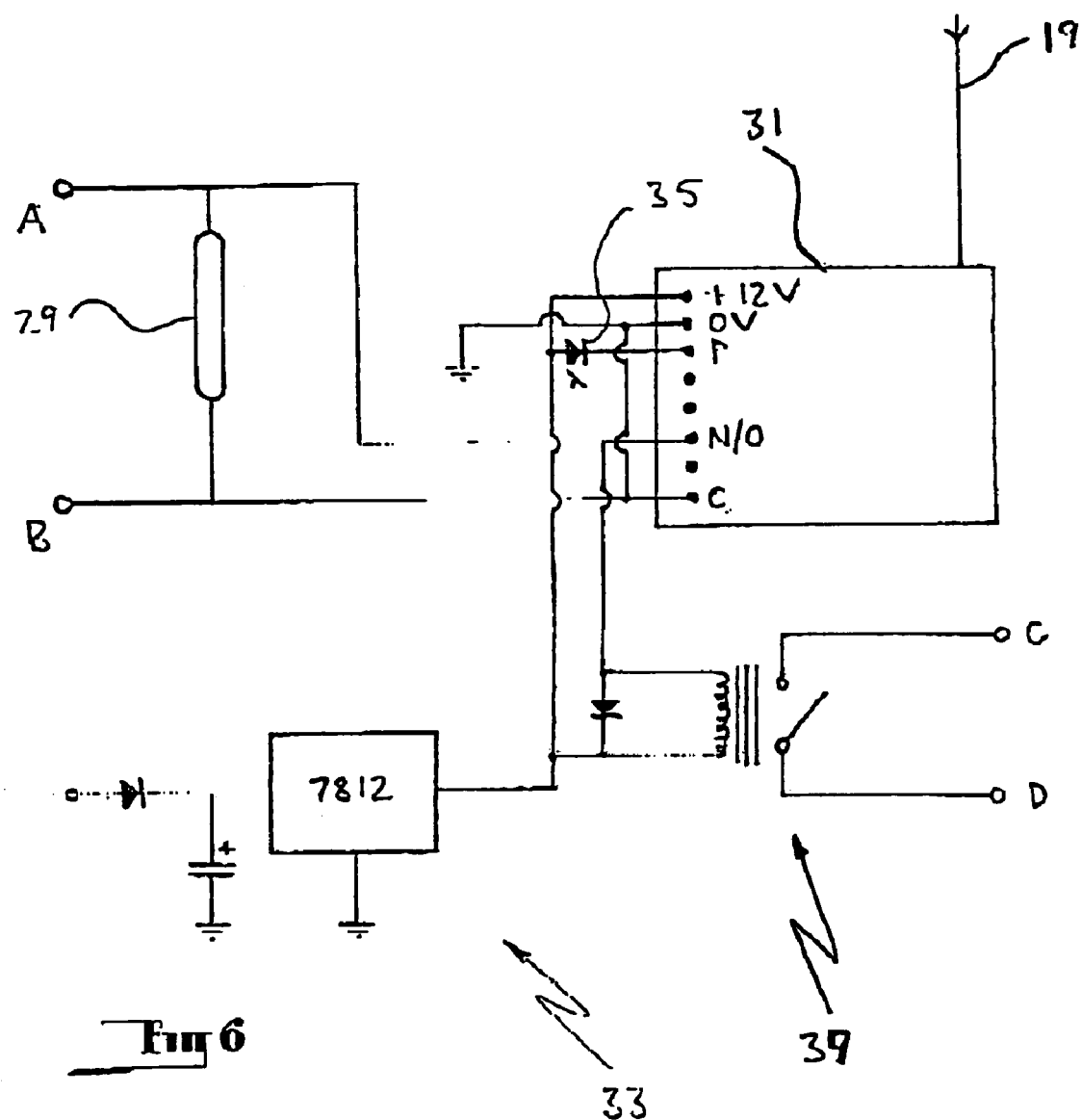
FIG. 6 is a wiring diagram showing implementation of the receiver unit according to the third embodiment.

The third embodiment shown in FIG. 6 is the same as the second embodiment except that the solid state relay 37 is replaced with a conventional mechanical relay 39.

The fourth and fifth embodiments are the same as the second and third embodiments respectively, except that the push-to-make switch must be pressed twice (ie double pressed as in double clicking the left button of a mouse of a computer with Microsoft Windows applications) within the first predetermined period of half a second, before the transmitter circuit 11 will begin transmitting.

All embodiments provide a useful safety feature in welders of all types, including stick welders, MIG, TIG, and plasma.

It should be appreciated that the scope of the invention is not limited to the specific embodiments disclosed herein, and changes may be made that fall within the spirit and scope of the invention. For example, the magnetic field sensing may be performed by a hall-effect sensor associated with a ferrite toroid, or a current transformer interfaced to the control side of the relay 25 (in which case, buffering will be simplified). The radio interface between the switch 15 and the timer circuit 23 may be omitted, but the radio interface provides some flexibility in use of the welder. In particular, the encrypted coding being specific to different welders ensures that only the correct welder will operate, in a manufacturing/production application where there are a number of arc welders. Further there is an additional benefit that if the arc welder is stolen without the transmitter unit, it will not be operable. Further changes could include replacement of the relays or solid state relay with multiple thyristors for multiphase operation.

It should also be appreciated that the manner of interfacing the safety interlock system is not limited to any particular method. While the forgoing discussion has been with respect to interfacing to the control circuitry of the arc welder, it would be possible to interface with the power supply to control the arc welder, if desired. This would be necessary in the case of AC welders that do not incorporate control circuitry, where the safety interlock system can interface to thyristor(s) to control the input power supply, or perhaps in an alternative arrangement to the output of the arc welder. Furthermore, the safety interlock system could be incorporated into the main circuitry of the arc welder, by the manufacturer.

The invention claimed is:

1. A safety interlock system for an arc welder, said safety interlock system comprising:
   an actuating circuit responsive to a command signal for turning on said arc welder, said command signal being produced by a user pressing a push switch, said actuating circuit having an output normally in an off condition and arranged to go to an on condition in response to said command signal, said output being interfaced with said arc welder to turn on said arc welder in said on condition;
   a timer to place said output in said on condition for a predetermined period of time whereafter said off condition is resumed;
   a latching circuit responsive to a parameter indicative of a welding operation underway, and adapted to maintain said arc welder operative until said parameter ceases, wherein said actuating circuit operates said output to go into said on condition only once for said predetermined period, and on resumption of said off condition, said push switch must first be released and re-pressed by the user before said actuating circuit will operate said output to again go to said on condition.

2. A safety interlock system as claimed in claim 1 wherein said predetermined period of time is from half a second to four seconds.

3. A safety interlock system as claimed in claim 1 wherein said predetermined period of time is from about one to about three seconds.

4. A safety interlock system as claimed in claim 1 wherein said predetermined period of time is about two seconds.

5. A safety interlock system as claimed in claim 1 wherein said output comprises a switch controlled by said timer, the latching circuit comprises a magnetic field sensor, and has switching means wired in parallel with said switch, said magnetic field sensor being located in close proximity to the main cable supplying current for the arc welding operation, so that the switching means is actuated when the magnetic field sensor detects current in the main cable.

6. A safety interlock system as claimed in claim 5 wherein said magnetic field sensor and said switching means are provided by a reed switch.

7. A safety interlock system as claimed in claim 1 including a first timer timing out a first predetermined period said push switch must be pressed before said output goes to said on condition.

8. A safety interlock system as claimed in claim 7 wherein said first predetermined period is at least 0.1 seconds.

9. A safety interlock system as claimed in claim 7 wherein said first predetermined period is at least 0.25 seconds.

10. A safety interlock system as claimed in claim 7 wherein said first predetermined period is from 0.5 seconds to two seconds.

11. A safety interlock system as claimed in claim 7 wherein said first predetermined period is about half a second.

12. A safety interlock system as claimed in claim 7 wherein said safety interlock system includes a transmitter and receiver pair, said transmitter being responsive to said push button switch being pressed, and said receiver providing said command signal in response to a valid signal received from said transmitter, wherein said timer is associated with said transmitter, and wherein said transmitter incorporates said first timer, timing out said first period before said transmitter will transmit a signal.

13. A safety interlock system as claimed in claim 7 wherein said safety interlock system includes a transmitter and receiver pair, said transmitter being responsive to said push button switch being pressed, and said receiver providing said command signal in response to a valid signal received from said transmitter, wherein said timer is associated with said receiver, and wherein said transmitter incorporates said first timer, timing out said first period before said transmitter will transmit a signal, and wherein said transmitter includes a second timer timing out a second predetermined period that said transmitter transmits said signal.

14. A safety interlock system as claimed in claim 7 wherein said safety interlock system includes a transmitter and receiver pair, said transmitter being responsive to said push button switch being pressed, and said receiver providing said command signal in response to a valid signal received from said transmitter, wherein said timer is associated with said receiver, and wherein said transmitter incorporates said first timer, timing out said first period before said transmitter will transmit a signal, and wherein said transmitter includes a second timer timing out a second predetermined period that said transmitter transmits said signal, and wherein said second predetermined period is from half a second to four seconds.

15. A safety interlock system as claimed in claim 7 wherein said safety interlock system includes a transmitter and receiver pair, said transmitter being responsive to said push button switch being pressed, and said receiver providing said command signal in response to a valid signal received from said transmitter, wherein said timer is associated with said receiver, and wherein said transmitter incorporates said first timer, timing out said first period before said transmitter will transmit a signal, and wherein said transmitter includes a second timer timing out a second predetermined period that said transmitter transmits said signal, and wherein said second predetermined period is from about one to about three seconds.

16. A safety interlock system as claimed in claim 7 wherein said safety interlock system includes a transmitter and receiver pair, said transmitter being responsive to said push button switch being pressed, and said receiver providing said command signal in response to a valid signal received from said transmitter, wherein said timer is associated with said receiver, and wherein said transmitter incorporates said first timer, timing out said first period before said transmitter will transmit a signal, and wherein said transmitter includes a second timer timing out a second predetermined period that said transmitter transmits said signal, and wherein said second predetermined period is about two seconds.

17. A safety interlock system as claimed in claim 7 wherein said first timer times out said first predetermined period said push switch must be held pressed by the user before said actuating circuit operates said output to go into said on condition.

18. A safety interlock system as claimed in claim 7 wherein said first timer times out said first predetermined period within which said push switch must be pressed at least twice (at least double clicked) by the user before said actuating circuit operates said output to go into said on condition.

19. A safety interlock system as claimed in claim 7 wherein said first timer times out said first predetermined period within which said push switch must be pressed twice (double clicked) by the user before said actuating circuit operates said output to go into said on condition.

20. A safety interlock system as claimed in claim 7 wherein said first timer times out said first predetermined period within which said push switch must be pressed twice and held pressed on the second pressing by the user before said actuating circuit operates said output to go into said on condition.

21. A safety interlock system as claimed in claim 1 wherein said timer is associated with said actuating circuit.

22. A safety interlock system as claimed in claim 1 wherein said safety interlock system includes a transmitter and receiver pair, said transmitter being responsive to said push button switch being pressed, and said receiver providing said command signal in response to a valid signal received from said transmitter.

23. A safety interlock system as claimed in claim 22 wherein said timer is associated with said transmitter.

24. A safety interlock system as claimed in claim 22 wherein said transmitter incorporates said first timer, timing out said first period before said transmitter will transmit a signal.

25. A safety interlock system as claimed in claim 24, wherein said transmitter includes a second timer timing out a second predetermined period that said transmitter transmits said signal.

26. A safety interlock system as claimed in claim 24 wherein said transmitter includes a second timer timing out a second predetermined period that said transmitter transmits said signal, and wherein said second predetermined period is from half a second to four seconds.

27. A safety interlock system as claimed in claim 24 wherein said transmitter includes a second timer timing out a second predetermined period that said transmitter transmits said signal, and wherein said second predetermined period is from about one to about three seconds.

28. A safety interlock system as claimed in claim 24 wherein said transmitter includes a second timer timing out a second predetermined period that said transmitter transmits said signal, and wherein said second predetermined period is about two seconds.

29. A safety interlock system as claimed in claim 22 wherein said transmitter and receiver pair incorporate coded encryption.

* * * * *